Dec. 15, 1925.
M. SIZAIRE
1,565,517
BRAKE FOR MOTOR VEHICLES
Filed Feb. 3, 1925
2 Sheets-Sheet 1
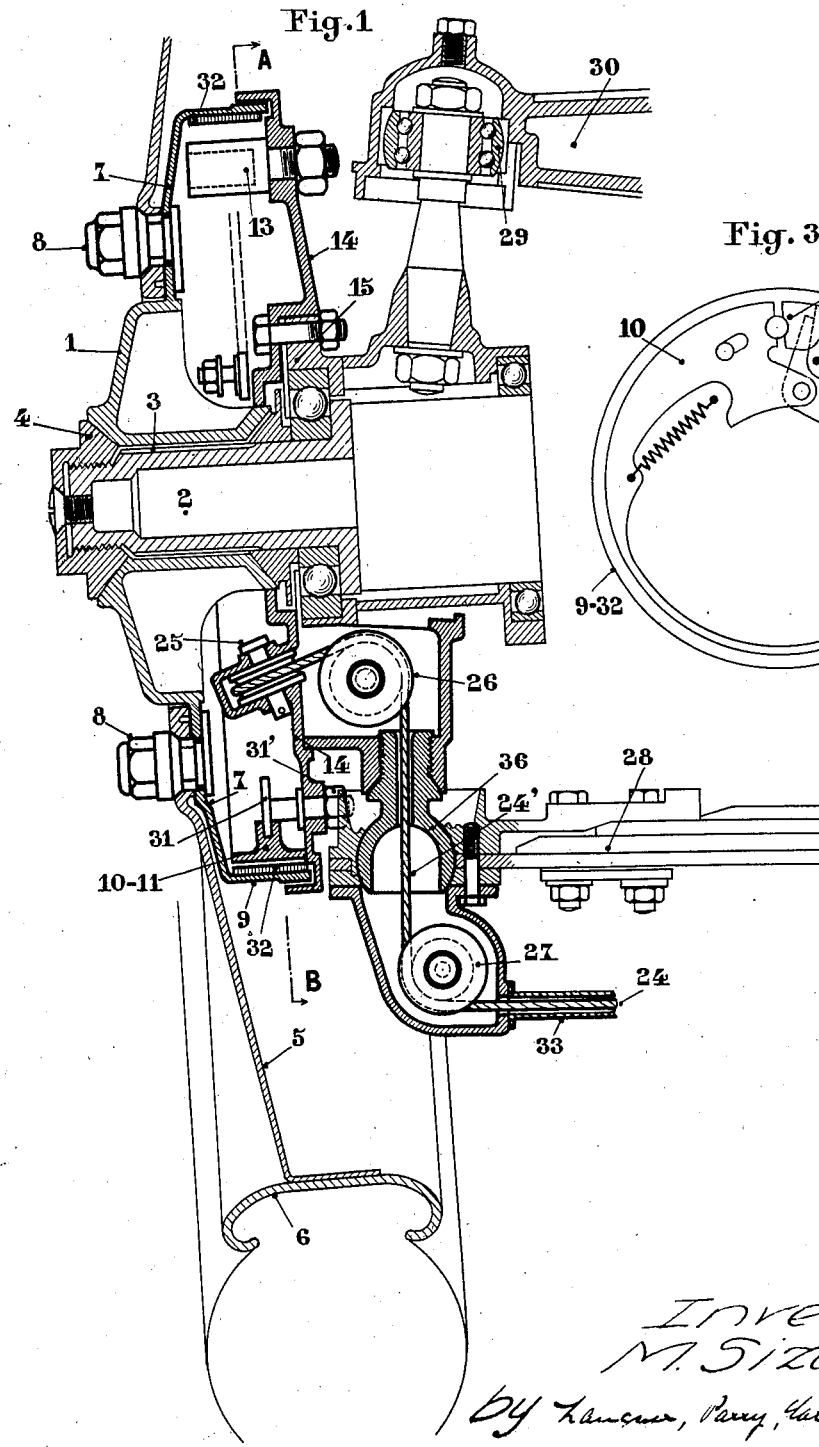
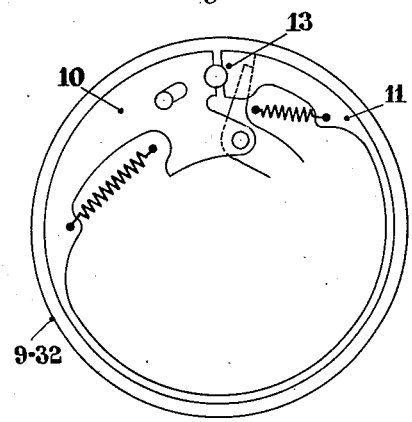
Inventor
M. Sizaire Dec. 15, 1925.

M. SIZAIRE

BRAKE FOR MOTOR VEHICLES

Filed Feb. 3, 1925    2 Sheets-Sheet 2

1,565,517

Inventor
M. Sizaire
by Langner, Parry, Card & Langner
Attys

Patented Dec. 15, 1925.

1,565,517

UNITED STATES PATENT OFFICE.

MAURICE SIZAIRE, OF COURBEVOIE, FRANCE, ASSIGNOR TO SOCIETE DES AUTOMOBILES SIZAIRE, OF COURBEVOIE, FRANCE.

BRAKE FOR MOTOR VEHICLES.

Application filed February 3, 1925. Serial No. 6,592.

*To all whom it may concern:*

Be it known that I, MAURICE SIZAIRE, a French citizen, and resident of 52 Rue Victor Hugo, Courbevoie, France, have invented certain new and useful Improvements Relating to Brakes for Motor Vehicles (for which I have filed an application in Belgium, dated 22nd February, 1924), of which the following is a specification.

The present invention relates to a brake device for automobile vehicles.

This device is hereinafter described as applied to steering wheels, mounted in a system of suspension of the type described in the specification filed on application Serial No. 600,950, dated 14th November, 1922, but it may be applied to vehicles having other types of suspension.

In the accompanying drawings:—

Figure 1 illustrates a cross section of a steering wheel applied to the type of suspension above referred to and provided with the brake device according to the present invention. This section is made on the line C—D of Figure 2.

Figures 3, 4 and 5 illustrate to a smaller scale the position of the brake ring respectively in the state of release, of tightening in one direction of rotation and tightening in the other direction of rotation.

Figure 2:
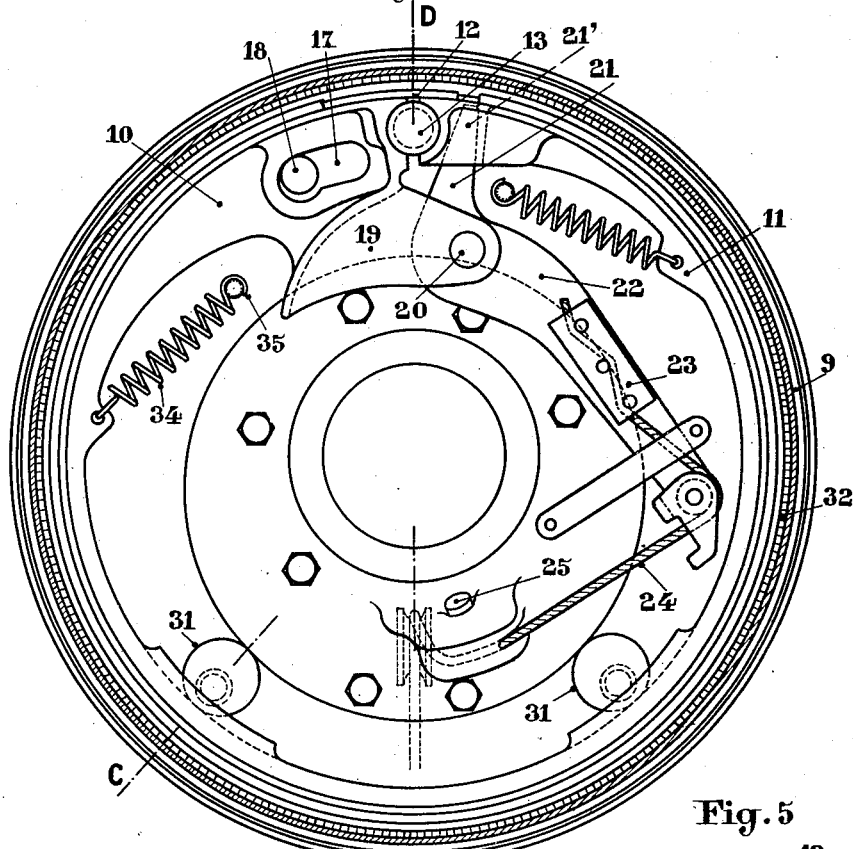
Figure 2 shows the brake mechanism proper in front view, on a section along the line A—B of Figure 1.

The wheel illustrated, which is a full disc steering wheel, comprises a hub 1 mounted on the shaft 2 by means of a suitable mounting with grooves 3 and locking cone 4, and a sheet metal disc 5, fitted with a rim 6, secured to the hub 1 by means of the bolts 8.

The hub 1 carries the brake drum 7—9 of which the lateral portion 7 is secured to the disc 5 of the wheel by means of bolts 8.

The friction lining of the brake, which is either of metal or of one of the special materials or compositions for this purpose, is not secured as usual to the non-rotating part, which is the flexible ring hereinafter referred to, but to the rotary part which is the drum 7—9 secured to the hub. This lining is indicated at 32.

The arrangement of the friction lining on the rotary part, instead of on the stationary part, has the advantage of more regular wear, of greater regularity in the braking action, and a better cooling.

In the interior of the drum 9, provided with its lining 32, is located the member which fulfills the operation of the usual brake jaws. This member consists of a metal ring divided by a cut at a point of its circumference and thus made flexible; this ring, in a single piece, is indicated by 10 and 11 which indicate the two parts on opposite sides of the cut 12.

The ends of the parts 10 and 11 are provided with recesses by means of which they bear against a stop 13; this stop 13 is secured to an annular plate 14 secured to the stationary part 15 of the hub connected to the suspension members by pivot or roller devices for permitting the steering of the wheel.

The part 10 of the brake ring is provided with an oblong opening 17 with which engages and wherein is guided a stationary gudgeon pin 18 secured to the plate 14; it is also provided with an extension 19 to which is secured a shaft 20 on which is pivotally mounted a lever 21—22. The end 21' of this lever 21—22 is engaged in an opening provided in the part 11 of the ring; to the other arm 22 of the lever is attached at 23 the cable 24 connected to the brake operating members.

The cable 24 passes around pulleys 25, 26 and 27 mounted on the stationary part in such a manner that the part 24' of the cable extends substantially along the pivoting axis of the wheel.

The stationary part includes all the parts which are stationary in relation to the turning body of the wheel, but which can pivot so as to enable the latter to be steered on an axis determined by the lower spherical member 36 placed at the end of the suspension spring 28 and the upper spherical member 29 placed at the end of a shock absorbing arm 30 in accordance with the device described in the earlier patent referred to.

The adjustment of the movement of the brake is obtained by means of small eccentric rollers 31 mounted on the stationary cast plate and engaging with an internal groove of the ring 10—11.

When the adjustment has been made these rollers are locked by means of screws 31'.

The friction lining 32 of the brake, of metal or of a special material or composition for this purpose, is not fixed, as is usual, to the non-rotating part which, in the system described, is the ring 10—11.

On the contrary this lining 32 is secured to the interior face of the rotating drum 9 which gives the advantage of more regular wear, a more regular braking action and a better cooling.

The ring 10—11 of which the flexibility results from it being cut at 12 is held in the non-braking position, which is that in Figures 2 and 3, by springs 34 attached at suitable points to the ring 10—11 and to the stationary cast plate.

Figure 4:
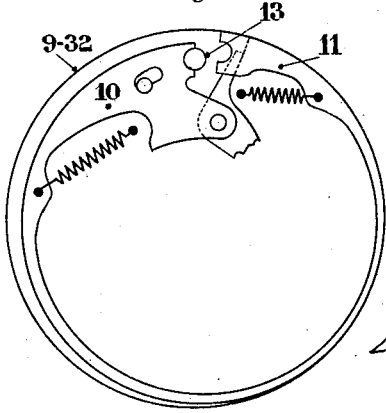
Figure 5:
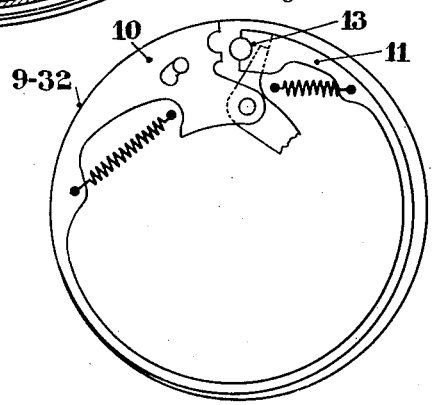

Figures 3, 4 and 5 show diagrammatically the ring 10—11 in the non-braking position, in the braking position in one direction and the braking position in the other direction of rotation, the ring bearing upon the fixed stop 13 by one or other of its ends 10 or 11.

The operating cable is disposed in a flexible sleeve 33 along its whole length up to the operating member, pedal, lever or equivalent member.

These devices permit of a certain and regular operation of the brake of steering wheels; it will be understood that they may be applied to wheels mounted on a different type of suspension to that here referred to and they may also be used for effecting the braking of non-steering wheels.

Having thus described my invention what I claim as new and desire to secure by Letters Patent is:—

1. A brake device for the wheels of motor vehicles comprising a brake drum secured to said wheel, a brake lining secured to the interior of said drum, a non-rotatable annular plate carried by the hub of the wheel, a divided resilient ring located within said drum and adapted to cooperate with said lining, said divided ring having recesses at its ends, a stop secured to the annular plate for engagement with said recesses, adjustable guide rollers mounted on said plate and engaging with the divided ring for the purpose of adjusting said ring in relation to the brake lining, an extension at one end of said ring, the other end of the ring having an opening therein, a bell crank lever pivotally mounted on said extension, one arm of said bell crank lever engaging with said opening, operating means connected to the other arm of said bell crank lever, and springs attached to the ring and the plate, said springs being adapted to normally contract the ring and separate it from the brake lining.

2. In combination a stub axle, a wheel having its hub mounted on said stub axle, suspension means for said stub axle, said means being such as to enable said wheel to be turned about a vertical axis, a brake drum secured to said wheel, a non-rotatable plate mounted on said hub, a divided resilient brake ring disposed within said drum and adapted to co-operate therewith, means for adjusting the brake ring in relation to said drum, a stop secured to said plate and co-operating with the ends of the brake ring, an extension at one end of said brake ring, a bell crank lever pivotally mounted on said extension, one arm of said bell crank lever engaging the other end of the brake ring, an operating cable connected to the other arm of the bell crank lever, and guide pulleys for said cable, said guide pulleys being so arranged that a portion of the cable extends substantially along the vertical axis about which the wheel can be turned.

3. In combination a stub axle, a disc-wheel having its hub mounted on said stub axle, suspension means for said stub axle, said suspension means permitting the stub axle and wheel to be turned about a vertical axis, a brake drum secured to the disc wheel, a brake lining in the interior of said drum, a divided resilient brake ring located within the drum for co-operation with the brake lining, a non-rotatable plate secured to the suspension means, said brake ring having an elongated slot at one end, a pin on said plate engaging said slot, springs attached to said plate and said ring, the ends of the ring having recesses therein, a stop secured to said plate and adapted to co-operate with the recesses, said springs being adapted to contract said ring so as to withdraw it from the brake lining and bring the said recesses into engagement with said stop, an extension at one end of said ring, the other end of said ring having an opening therein, a bell crank lever pivotally mounted on said extension, one arm of said bell crank lever engaging said opening, a cable attached to the other arm of said bell crank lever, guide rollers for said cable, said guide rollers being so arranged that a portion of the cable extends substantially along said vertical turning axis, and eccentric rollers mounted in said plate, said eccentric rollers engaging said brake and being adapted to be adjusted so as to adjust the brake ring in relation to the brake lining.

MAURICE SIZAIRE.